United States Patent Office 3,235,624
Patented Feb. 15, 1966

3,235,624
STABILIZED POLYOXYMETHYLENE
COMPOSITIONS
Richard Green, Livingston, N.J., assignor, by mesne assignments, to Tenneco Chemicals, Inc., a corporation of Delaware
No Drawing. Filed Dec. 4, 1962, Ser. No. 242,074
20 Claims. (Cl. 260—857)

This invention relates to polyoxymethylene compositions. More particularly it relates to polyoxymethylene compositions having a high degree of thermal stability.

High molecular weight polyoxymethylenes have been developed recently that show great promise in the plastics industry. These polymers have a combination of physical properties, that is, toughness, stiffness, and tensile strength, that make them useful in the manufacture of shaped articles, such as films, filaments, fibers, rods, tubes, and the like. The polyoxymethylenes, however, are subject to considerable degradation at the high temperatures that are required in their processing or that may be encountered by the finished articles. They may also be degraded by chain cleavage resulting from oxidation, attack by acids, or hydrolysis.

It is known in the art that various additives can be incorporated into polyoxymethylene to protect the polymer chain from the aforementioned degradative reactions. For example, superpolyamides have been used alone or in combination with antioxidants to stabilize polyoxymethylene. While the resulting compositions are far more resistant to thermal degradation than the original polyoxymethylene, it is nevertheless desirable for many uses that the thermal stability of these compositions be further improved.

It is an object of the present invention to provide high molecular weight polyoxymethylene compositions having improved thermal stability. It is a further object to provide stabilizers that can be incorporated into polyoxymethylene to produce compositions that are more stable than the original polyoxymethylene. Other objects will be apparent from the detailed description of the invention that follows.

These objects may be accomplished in accordance with the present invention by intimately associating a normally solid, high molecular weight polyoxymethylene with a stabilizer mixture comprising a superpolyamide, a phenolic antioxidant, and an ester of a thiodialkanoic acid. The resulting compositions are characterized by a level of thermal stability that is substantially higher than that of the previously known polyoxymethylene compositions.

The superpolyamides that are used in the novel stabilizer mixtures are the macromolecular superpolyamides, commonly known as nylons, that have carboxamide linkages

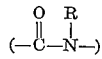

as integral portions of their polymer chains. These superpolyamides preferably have melting points below approximately 220° C., have carboxamide linkages

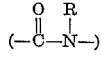

in which R represents a hydrogen atom, a lower alkyl group, or a lower alkoxy group, and have a degree of polymerization of approximately 100 to 200. A preferred group of the superpolyamides includes those condensation polymers that on hydrolysis yield either omega-aminocarboxylic acids or mixtures of dicarboxylic acids and diamines. Among the useful superpolyamides are the condensation productions of the following diamines and dicarboxylic acids:
pentamethylenediamine/malonic acid;
pentamethylenediamine/pimelic acid;
hexamethylenediamine/adipic acid;
hexamethylenediamine/sebacic acid;
N,N'-hydroxymethylhexamethylenediamine/adipic acid;
N,N'-methoxymethylhexamethylenediamine/adipic acid;
octamethylenediamine/suberic acid;
1,1,6,6-tetramethylhexamethylenediamine/sebacic acid;
decamethylenediamine/2,2,5,5-tetramethyladipic acid;
and 2,5-dimethylpiperazine/glutaric acid.
Also useful are the superpolyamides that are the self-condensation polymers derived, for example, from 6-aminocaproic acid, 9-aminononanoic acid, 11-aminoundecanoic acid, or their lactams. Superpolyamides that are copolymers or terpolymers can also be used.

The second component of the stabilizer mixture is a phenolic antioxidant having the formula

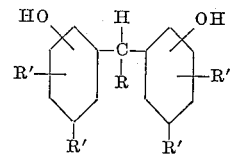

wherein R represents a hydrogen atom or an alkyl group having from 1 to 3 carbon atoms and each R' represents an alkyl group having from 1 to 4 carbon atoms. Illustrative of these compounds are the following: 2,2'-methylene bis(4-methyl-6-tert. butylphenol), 6,6'-methylene bis (2,4-xylenol), 2,2'-methylene bis (4-ethyl-6-tert. butylphenol), 4,4'-methylene bis (2,6-di-tert, butylphenol), 6,6'-ethylidene bis (2,4-xylenol), 4,4'-ethylidene bis (2,5-xylenol), 2,2'-ethylidene bis (4-methyl-6-tert. butylphenol), 6,6'-propylidene bis (2,4-xylenol), 4,4'-butylidene bis (3-methyl-6-tert. butylphenol), 6,6'-butylidene bis 2(4-xylenol), 2,2'-butylidene bis (4-tert. butyl-6-methylphenol), 6,6' - butylidene bis (2,4 - xylenol), 4,4' - butylidene bis (2,5-xylenol), and the like. A single phenolic antioxidant or a mixture of two or more of these compounds may be present in the stabilizer mixture.

The thiodialkanoic acid esters that are used in combination with the superpolyamide and the phenolic antioxidant have the formula

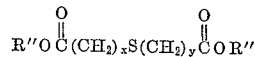

wherein $x$ and $y$ each represents a number in the range of 1 to 3 and each R" represents an alkyl group having from 8 to 20 carbon atoms, a cycloalkyl group, a hydroxyalkyl group having from 1 to 4 carbon atoms, or a polyalkylene glycol group. These esters include, for example, dilauryl thiodiacetate, distearyl thiodiacetate, dioctyl 3,3'-thiodipropionate, didecyl 3,3'-thiodipropionate, dicetyl 3,3'-thiodipropionate, distearyl 3,3'-thiopropionate, dieicosyl 3,3'-thiodipropionate, lauryl stearyl 3,3'-thiodipropionate, dicyclohexyl 3,3'-thiodipropionate, di (4-ethylcyclohexyl) 3,3'-thiodipropionate, di (hydroxymethyl)3,3'-thiodipropionate, di (hydroxyethyl) 3,3'-thiodipropionate, di (hydroxybutyl) 3,3'-thiodipropionate, di (polyethylene glycol) 3,3′-thiodipropionate, dioctyl 4,4′-thiodibutyrate, and dilauryl 4,4′-thiodibutyrate. The preferred esters are the esters of thiodipropionic acid in which each R″ represents an alkyl group having from 12 to 18 carbon atoms, for example, dilauryl 3,3′-thiodipropionate, dicetyl 3,3′-thiodipropionate, distearyl 3,3′-thiodipropionate, and lauryl stearyl 3,3′-thiodipropionate.

The amount of the stabilizer mixture that is used in the novel compositions depends largely upon the inherent stability of the polyoxymethylene and the properties desired in the stabilized compositions. In most cases the stabilized polyoxymethylene compositions contain approximately 0.01% to 50% of the superpolyamide, 0.01% to 10% of the phenolic antioxidant, and 0.0001% to 1% of the thiodialkanoic acid ester based on the weight of the polyoxymethylene. The preferred compositions contain approximately 0.05% to 3% of the superpolyamide, 0.01% to 1% of the phenolic antioxidant, and 0.001% to 0.8% of the thiodialkanoic acid ester based on the weight of the polyoxymethylene.

The combination of superpolyamide, phenolic antioxidant, and thiodialkanoic acid ester as hereinbefore described can be used to stabilize a wide variety of polyoxymethylene compositions against thermal degradation. Any of the normally solid formaldehyde polymers and copolymers can be stabilized in accordance with this invention. The stabilizer mixture is preferably used in high molecular weight polyoxymethylene compositions. The term "polyoxymethylene' as used herein is intended to include both homopolymers of formaldehyde in which the polymer chain consists essentially of oxymethylene $$-(CH_2O)-$$

units and copolymers whose polymer chains contain a major amount of oxymethylene units and a minor amount of comonomer units, such as oxyalkylene groups containing two or three carbon atoms and groups derived from gamma butyrolactone, phthalide, or isocyanic acid. The formaldehyde homopolymers and copolymers may be prepared by processes that are well known in the art. For example, high molecular weight homopolymers may be prepared by polymerizing anhydrous monomeric formaldehyde in the presence of a polymerization initiator that is a primary or secondary aliphatic amine, an organometallic compound, or a metal carbonyl. The formaldehyde copolymers may be prepared by polymerizing a monomer mixture containing approximately 2 to 80 parts of a copolymerizable monomer, such as ethylene oxide, propylene oxide, 1,3-dioxalane, gamma butyrolactone, phthalide, or isocyanic acid per 100 parts of anhydrous monomeric formaldehyde in the presence of one of the aforementioned polymerization initiators.

The polyoxymethylenes that are used in the practice of this invention preferably have carboxylate groups or alkoxy groups as the terminal groups of their chains. Procedures for the preparation of the polyoxymethylene dicarboxylates or polyoxymethylene ethers are well known in the art. For example, a process for the acylation of polyoxymethylenes is described in Wagner Patent No. 3,046,251, and a process for the formation of dialkyl ethers of polyoxymethylenes is described in Belgian Patent No. 583,593. The term "high molecular weight polyoxymethylenes" as used herein refers to those polyoxymethylene dicarboxylates and polyoxymethylene dialkyl ethers that have number average molecular weights of at least 15,000 and preferably at least 20,000.

The stabilizer mixture may be incorporated in the polyoxymethylene compositions by any convenient procedure. One method for the preparation of the compositions of this invention involves forming solutions of the stabilizer components in a volatile solvent, such as a ketone, lower alkanol, or chlorinated hydrocarbon, adding to the polyoxymethylene amounts of the solutions that will provide the desired amounts of the stabilizer components in the composition, and removing the solvent by evaporation.

Alternatively, the stabilized compositions can be prepared by milling the dry solids together or by dissolving both the polyoxymethylene and the stabilizer components in a common solvent and then removing the solvent by evaporation. In a preferred embodiment of the invention a stabilizer mixture which is a solution of the stabilizer components in a volatile solvent is added to the polyoxymethylene in the amounts required to provide the aforementioned amounts of the stabilizer components in the resulting compositions. The stabilizer mixtures generally contain approximately 0.1 to 100 parts by weight of the superpolyamide and 0.1 to 50 parts by weight of the phenolic antioxidant per part by weight of the thiodialkanoic acid ester. The preferred mixtures contain approximately 1 to 20 parts by weight of the superpolyamide and 1 to 10 parts by weight of the phenolic antioxidant per part by weight of the thiodialkanoate. Suitable solvents for the stabilizer components include ketones, lower alkanols, chlorinated hydrocarbons, and mixtures thereof.

This invention is further illustrated by the examples that follow. It is to be understood, however, that these examples are included merely for the purpose of illustration and that they are not to be construed as being limitative except as set forth in the appended claims. In this specification and in the claims all proportions are by weight unless otherwise indicated.

*Example 1*

A series of stabilized polyoxymethylene compositions was prepared by the following procedure: To one part of polyoxymethylene diacetate (molecular weight—ca. 30,000) were added 1.5 parts of a 1% solution of a superpolyamide in acetone, 0.3 part of a 1% solution of 4,4′-butylidene bis (3-methyl-6-tert. butylphenol) in acetone, and 0.1 part of a 1% solution of dilauryl 3,3′-thiodipropionate in acetone. The resulting mixtures were air-dried to remove the acetone. Thermal stability ratings were determined by measuring the weight loss that the stabilized polyoxymethylene composition underwent on heating in an oxidizing atmosphere for 30 minutes at 222° C. as well as the weight loss of the unstabilized polyoxymethylene when subjected to this same heat treatment. The thermal stability ratings were calculated using the following formulation:

Thermal stability rating =

$$\frac{\text{Loss of wt. of unstabilized polyoxymethylene} - \text{Loss of wt. of stabilized polyoxymethylene}}{\text{Loss of wt. of unstabilized polyoxymethylene}} \times 100$$

A stabilizer giving complete protection to the polyoxymethylene under the conditions of the test will accordingly have a thermal stability rating of 100. For most purposes it is required that the polyoxymethylene compositions have a thermal stability rating of at least 90 and preferably at least 95.

The superpolyamides that were used in the stabilizer mixtures and the thermal stability ratings of the stabilized polyoxymethylene compositions are given in Table I.

TABLE I.—THERMAL STABILITY RATINGS OF POLYOXYMETHYLENE COMPOSITIONS CONTAINING AS STABILIZER 1.5% OF A SUPERPOLYAMIDE, 0.3% OF 4,4′-BUTYLIDENE BIS (3-METHYL-6-TERT. BUTYLPHENOL), AND 0.1% OF DILAURYL 3,3′-THIODIPROPIONATE

| Ex. No. | Superpolyamide | Thermal stability index |
|---|---|---|
| 1A | Terpolymer of approximately 38% polycaprolactam/35% polyhexamethylene adipamide/27% polyhexamethylene sebacamide. | 98.0 |
| 1B | N-methoxymethyl polyhexamethylene adipamide. | 99.2 |
| 1C | N-hydroxymethyl polyhexamethylene adipamide. | 96.0 |
| 1D | Polycaprolactam | 96.5 |

Example 2

A series of stabilized polyoxymethylene compositions that contained as stabilizer 1.5% of a superpolyamide which was a terpolymer of approximately 38% polycaprolactam/35% polyhexamethylene adipamide/27% polyhexamethylene sebacamide, 0.3% of a phenolic antioxidant, and 0.1% of dilauryl 3,3'-thiodipropionate was prepared by the procedure described in Example 1. The antioxidants that were used in the stabilizer mixtures and the thermal stability ratings of the stabilized polyoxymethylene compositions are given in Table II.

TABLE II.—THERMAL STABILITY RATINGS OF POLYOXYMETHYLENE COMPOSITIONS CONTAINING AS STABILIZER 1.5% OF A TERPOLYMER OF APPROXIMATELY 38% POLYCAPROLACTAM/35%POLYHEXAMETHYLENE ADIPAMIDE/27% POLYHEXAMETHYLENE SEBACAMIDE, 0.3% OF A PHENOLIC ANTIOXIDANT, AND 0.1% OF DILAURYL 3.3'-THIODIPROPIONATE

| Ex. No. | Phenolic antioxidant | Thermal stability rating |
|---|---|---|
| 2A | 2,2'-methylene bis (4-methyl-6-tert. butylphenol) | >99 |
| 2B | 4,4'-methylene bis (2,6-di-tert. butylphenol) | 98.8 |
| 2C | 4,4'-ethylidene bis (3-methyl-6-tert. butylphenol) | 90.0 |
| 2D | 6,6'-ethylidene bis (2,4-xylenol) | 91.6 |
| 2E | 6,6'-propylidene bis (2,4-xylenol) | 91.6 |
| 2F | 2,2'-butylidene bis (3-methyl-6-tert. butylphenol) | 90.0 |
| 2G | 4,4'-butylidene bis (2,5-xylenol) | 93.6 |
| 2H | 6,6'-butylidene bis (2,4-xylenol) | 97.0 |
| 2I | 4,4'-butylidene bis (3-methyl-6-tert. butylphenol) | 98.0 |

Example 3

A series of stabilized polyoxymethylene compositions that contained as stabilizer 1.5% of a superpolyamide which was a terpolymer of approximately 38% polycaprolactam/35% polyhexamethylene adipamide/27% polyhexamethylene sebacamide, 0.3% of 4,4'-butylidene bis (3-methyl-6-tert. butylphenol) and 0.1% of a diester of 3,3'-thiodipropionic acid was prepared by the procedure described in Example 1. The esters that were used in the stabilizer mixtures and the thermal stability ratings of the stabilized polyoxymethylene compositions are given in Table III.

TABLE III.—THERMAL STABILITY RATINGS OF POLYOXYMETHYLENE COMPOSITIONS CONTAINING AS STABILIZER 1.5% OF A TERPOLYMER OF APPROXIMATELY 38% POLYCAPROLACTAM/35% POLYHEXAMETHYLENE ADIPAMIDE/27% POLYHEXAMETHYLENE SEBACAMIDE, 0.3% OF 4,4'-BUTYLIDENE BIS (3-METHYL-6-TERT. BUTYLPHENOL), AND 0.1% OF AN ESTER OF 3,3'-THIODIPROPIONIC ACID

| Ex. No. | Ester | Thermal stability rating |
|---|---|---|
| 3A | Dilauryl 3,3'-thiodipropionate | 98.0 |
| 3B | Distearyl 3,3'-thiodipropionate | 97.5 |
| 3C | Di-(2-hydroxyethyl) 3,3'-thiodipropionate | 99.6 |
| 3D | Di-(polyethylene glycol) 3,3'-thiodipropionate | 98.2 |

Example 4

A stabilized polyoxymethylene composition was prepared by adding to one part of polyoxymethylene diacetate (molecular weight—55,000) 1 part of a 1% solution of a superpolyamide in acetone, 0.35 part of a 1% solution of 4,4'-butylidene bis (3-methyl-6-tert. butylphenol) in acetone, and 0.65 part of a 1% solution of dilauryl 3,3'-thiodipropionate in acetone and air-drying the mixture to remove the acetone. For comparative purposes compositions were prepared which contained as stabilizer either 2% by weight of one of the aforementioned stabilizer components or a mixture comprising 1% of the aforementioned superpolyamide and 0.35% of 4,4'-butylidene bis (3-methyl-6-tert. butylphenol). The compositions were heated in an oxidizing atmosphere at 222° C. for 30 minutes. The weight lost by each of the compositions during the heating period and the color of the stabilized compositions are given in Table IV.

TABLE IV.—THERMAL STABILITY OF STABILIZED POLYOXYMETHYLENE COMPOSITIONS

| Ex. No. | Stabilizer | Percent loss of weight | Color |
|---|---|---|---|
| 4A | 1% superpolyamide;* 0.35% 4,4'-butylidene bis (3-methyl-6-tert. butylphenol); and 0.65% dilauryl 3,3'-thiodipropionate. | 0.8 | Off-white. |
| 4B | 1% Superpolyamide* and 0.35% 4,4'-butylidene bis (3-methyl-6-tert. butylphenol). | 6.5 | Light brown. |
| 4C | 2% superpolyamide* | 19.45 | Brown. |
| 4D | 2% 4,4'-butylidene bis (3-methyl-6-tert. butylphenol). | 13.03 | Dark yellow. |
| 4E | 2% dilauryl 3,3'-thiodipropionate | 12.90 | White |
| 4F | None | 35.86 | Off-white. |

*Terpolymer of approximately 38% polycaprolactam/35% polyhexamethylene adipamide/27% polyhexamethylene sebacamide.

From the data in Table IV it will be seen that the composition that contained the three-component stabilizer of the present invention (Ex. No. 4A) was far more resistant to thermal degradation than the compositions that contained approximately equivalent amounts of either a mixture of the superpolyamide and phenolic antioxidant (Ex. No. 4B) or a single stabilizer component (Ex. Nos. 4C, 4D, and 4E).

Example 5

A series of stabilized polyoxymethylene compositions that contained as stabilizer mixtures of a terpolymer of approximately 38% polycaprolactam/35% polyhexamethylene adipamide/27% polyhexamethylene sebacamide, 4,4'-butylidene bis (3-methyl-6-tert. butylphenol), and dilauryl 3,3'-thiodipropionate was prepared by the procedure described in Example 1. For comparative purposes compositions were prepared that contained one or two of the stabilizer components. The compositions were heated in an oxidizing atmosphere at 222° C. for 30 minutes. The amounts of the stabilizer components used and the weight lost by each of the compositions during the heating period are given in Table V.

TABLE V.—THERMAL STABILITY OF POLYOXYMETHYLENE COMPOSITIONS CONTAINING VARYING AMOUNTS OF SUPERPOLYAMIDE, PHENOLIC ANTIOXIDANT, AND ESTER OF 3,3-THIODIPROPIONIC ACID

| Ex. No. | Amounts (percent based on weight of polyoxymethylene diacetate) of stabilizer components | | | Percent loss in weight |
|---|---|---|---|---|
| | Superpolyamide* | 4,4'-butylidene bis (3-methyl-6-tert. butylphenol) | Dilauryl 3,3'-thiodipropionate | |
| 5A | 0.5 | 1.0 | 0.5 | 0.4 |
| 5B | 0.5 | 0.1 | 0.005 | 0.5 |
| 5C | 0.5 | 0.01 | 0.05 | 2.5 |
| 5D | 0.3 | 0.1 | 0.05 | 1.4 |
| 5E | 0.3 | 0.01 | 0.005 | 2.9 |
| 5F | 0.05 | 0.1 | 0.05 | 1.7 |
| 5G | 0.05 | 0.01 | 0.005 | 4.3 |
| 5H | 0.05 | 0.01 | | 7.4 |
| 5I | 0.05 | | | 8.2 |
| 5J | | 0.01 | | 15.6 |
| 5K | | | 0.005 | 18.0 |
| 5L | | | | 18.4 |

*Terpolymer of approximately 38% polycaprolactam/35% polyhexamethylene adipamide/27%polyhexamethylene sebacamide.

Example 6

A series of stabilized polyoxymethylene compositions that contained as stabilizer a mixture of a terpolymer of approximately 8% polycaprolactam/35% polyhexamethylene adipamide/27% polyhexamethylene sebacamide, 4,4'-butylidene bis (3-methyl-6-tert. butylphenol), and dilauryl 3,3'-thiodipropionate was prepared by the procedure described in Example 1. The compositions were heated in an oxidizing atmosphere at 222° C. for 30 minutes. The amounts of the stabilizer components used and the weight lost by each of the compositions during the heating period are given in Table VI.

TABLE VI.—THERMAL STABILITY OF POLYOXYMETHYLENE COMPOSITIONS CONTAINING VARYING AMOUNTS OF SUPERPOLYAMIDE, PHENOLIC ANTIOXIDANT, AND ESTER OF 3,3'-THIODIPROPIONIC ACID

| Ex. No. | Amounts (percent based on weight of polyoxymethylene diacetate) of stabilizer components | | | Percent loss in weight |
|---|---|---|---|---|
| | Superpolyamide* | 4,4'-butylidene bis (3-methyl-6-tert. butylphenol) | Dilauryl 3,3'-thiodipropionate | |
| 6A | 3.0 | 1.0 | 0.5 | 9.3 |
| 6B | 3.0 | 1.0 | 0.05 | 0.4 |
| 6C | 3.0 | 0.1 | 0.5 | 0.2 |
| 6D | 3.0 | 0.1 | 0.05 | 0.4 |
| 6E | 0.5 | 1.0 | 0.5 | 0.5 |
| 6F | 0.5 | 1.0 | 0.05 | 1.4 |
| 6G | 0.5 | 0.1 | 0.5 | 0.7 |
| 6H | 0.5 | 0.1 | 0.05 | 1.0 |
| 6I | 2.0 | | | 7.8 |
| 6J | | | 2.0 | 14.8 |
| 6K | | 2.0 | | 10.9 |
| 6L | | | | 16.2 |

*Terpolymer of approximately 38% polycaprolactam/35% polyhexamethylene adipamide/27% polyhexamethylene sebacate.

Example 7

A series of stabilized polyoxymethylene compositions that contained as stabilizer an N-methoxymethyl polyhexamethylene adipamide or a mixture of this superpolyamide with other stabilizer components was prepared by the procedure described in Example 1. The compositions were heated in an oxidizing atmosphere at 222° C. for 30 minutes. The weight lost by each of the compositions during the heating period is given in Table VII.

TABLE VII.—THERMAL STABILITY OF POLYOXYMETHYLENE COMPOSITIONS CONTAINING N-METHOXYMETHYL POLYHEXAMETHYLENE ADIPAMIDE

| Ex. No. | Stabilizer | Percent loss in weight |
|---|---|---|
| 7A | 1.5% N-methoxymethyl polyhexamethylene adipamide (6.2% CH₂OCH₃); 0.3% 4,4'-butylidene bis (3-methyl-6-tert. butylphenol); and 0.1% of dilauryl 3,3'-thiodipropionate. | 2.9 |
| 7B | 1.5% N-methoxymethyl polyhexamethylene adipamide (6.2% CH₂OCH₃) and 0.3% 4,4'-butylidene bis (3-methyl-6-tert. butylphenol). | 11.8 |
| 7C | 2% N-methoxymethyl polyhexamethylene adipamide (6.2% CH₂OCH₃). | 12.5 |
| 7D | 1.5% N-methoxymethyl polyhexamethylene adipamide (6.7% CH₂OCH₃); 0.3% 4,4'-butylidene bis (3-methyl-6-tert. butylphenol); and 0.1% of dilauryl 3,3'-thiodipropionate. | 4.6 |
| 7E | 1.5% N-methoxymethyl polyhexamethylene adipamide (6.7% CH₂OCH₃) and 0.3% 4,4'-butylidene bis (3-methyl-6-tert. butylphenol). | 14.1 |
| 7F | 2% N-methoxymethyl polyhexamethylene adipamide (6.7% CH₂OCH₃). | 14.7 |
| 7G | None | 16.3 |

From the data in Table VII it will be seen that in each series of compositions (Ex. Nos. 7A–7C and Ex. Nos. 7D–7F) the composition that contained the three-component stabilizer of the present invention was appreciably more resistant to thermal degradation than the composition that contained as stabilizer either the superpolyamide alone or a mixture of the superpolyamide and the phenolic antioxidant.

Example 8

To one part of polyoxymethylene diacetate (molecular weight—ca. 25,000) was added 1 part of a solution containing 1.5% of a superpolyamide prepared from 4,4-dimethylheptamethylenediamine and sebacic acid, 0.3% of 6,6'-ethylidene bis (2,4-xylenol), and 0.1% of dilauryl 3,3'-thiodipropionate in methanol. The resulting mixture was air-dried to remove the methanol. This composition lost 3% of its weight on being heated in an oxidizing atmosphere at 222° C. for 30 minutes, whereas the same polyoxymethylene diacetate which contained no stabilizer lost 18.9% of its weight during this heating period.

Example 9

For comparative purposes, a series of polyoxymethylene compositions that contained as stabilizer either 2% of a superpolyamide, 2% of a phenolic antioxidant, or 2% of an ester of 3,3'-thiodipropionic acid was prepared by the procedure described in Example 1. The stabilizers used and the thermal stability ratings of the stabilized polyoxymethylene compositions are given in Table VIII.

TABLE VIII.—THERMAL STABILITY RATINGS OF POLYOXYMETHYLENE COMPOSITIONS CONTAINING 2% OF A SINGLE STABILIZER COMPONENT

| Ex. No. | Stabilizer | Thermal stability rating |
|---|---|---|
| A | Terpolymer of approximately 38% polycaprolactam/35% polyhexamethylene adipamide/27% polyhexamethylene sebacamide. | 67.0 |
| B | N-Methoxymethyl Polyhexamethylene adipamide. | 89.0 |
| C | N-Hydroxymethyl polyhexamethylene adipamide. | 87.5 |
| D | Polycaprolactam. | 37.5 |
| E | 4,4'-Methylene bis (2,6-di-tert. butylphenol). | 78.8 |
| F | 2,2'-Methylene bis (4-methyl-6-tert. butylphenol). | 90.0 |
| G | 4,4'-Butylidene bis (3-methyl-6-tert. butylphenol). | 63.5 |
| H | Dilauryl 3,3'-thiodipropionate. | 48.5 |
| I | Distearyl 3,3'-thiodipropionate. | 48.3 |
| J | Di-(2-hydroxyethyl) 3,3'-thiodipropionate. | 43.5 |
| K | Di-(polyethylene glycol) 3,3'-thiodipropionate. | 32.4 |

Comparison of the data in Table VIII with that in Tables I, II, and III shows that in every case the polyoxymethylene composition containing as stabilizer a mixture consisting of a superpolyamide, a phenolic antioxidant, and an ester of 3,3'-thiodipropionate was far more resistant to thermal degradation than the corresponding composition that contained only one of the aforementioned stabilizer components.

The compositions of this invention may if desired contain other stabilizers, such as ultraviolet light absorbers, as well as plasticizers, fillers, pigments, solvents, dyes, etc., in the amounts ordinarily employed for the purposes indicated.

The stabilized compositions may be converted to films, fibers, molded articles, and the like by melt-extrusion, injection molding, compression molding, and other fabrication methods known in the art.

What is claimed is:

1. A thermally-stable resinous composition comprising polyoxymethylene having a number average molecular weight of at least 15,000 and a stabilizer mixture comprising (a) a superpolyamide which is a macromolecular condensation polymer that has recurring carboxamide linkages as integral portions of the polymer chain and which has a degree of polymerization of approximately 100 to 200; (b) a phenolic antioxidant having the formula

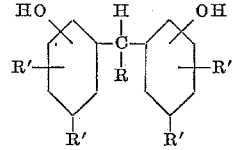

wherein R represents a member selected from the group consisting of a hydrogen atom and alkyl groups having from 1 to 3 carbon atoms and each R' represents an alkyl group having from 1 to 4 carbon atoms; and (c) a diester of a thiodialkanoic acid having the formula

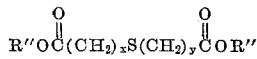

wherein $x$ and $y$ each represents a number in the range of 1 to 3 and each R'' represents a member selected from the group consisting of alkyl groups having from 8 to 20 carbon atoms, cycloalkyl groups, hydroxyalkyl groups having from 1 to 4 carbon atoms, and polyalkylene glycol groups in the amounts of approximately 0.01% to 50% of said superpolyamide, 0.001% to 10% of said phenolic antioxidant, and 0.0001% to 1% of said thiodialkanoic acid ester based on the weight of said polyoxymethylene.

2. A thermally-stable resinous composition comprising polyoxymethylene having a number average molecular weight of at least 15,000 and a stabilizer mixture comprising (a) a superpolyamide which is a macromolecular condensation polymer that has recurring carboxamide linkages as integral portions of the polymer chain and which has a degree of polymerization of approximately 100 to 200; (b) a phenolic antioxidant having the formula

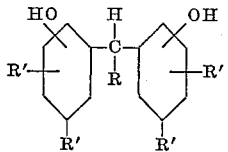

wherein R represents a member selected from the group consisting of a hydrogen atom and alkyl groups having from 1 to 3 carbon atoms and each R' represents an alkyl group having from 1 to 4 carbon atoms; and (c) a diester of a thiodialkanoic acid having the formula

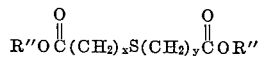

wherein $x$ and $y$ each represents a number in the range of 1 to 3 and each R'' represents a member selected from the group consisting of alkyl groups having from 8 to 20 carbon atoms, cycloalkyl groups, hydroxyalkyl groups having from 1 to 4 carbon atoms, and polyalkylene glycol groups in the amounts of approximately 0.05% to 3% of said superpolyamide, 0.01% to 1% of said phenolic antioxidant, and 0.001% to 0.8% of said thiodialkanoic acid ester based on the weight of said polyoxymethylene.

3. A thermally-stable resinous composition comprising polyoxymethylene diacetate having a number average molecular weight of at least 20,000 and a stabilizer mixture comprising (a) a superpolyamide which is a macromolecular condensation polymer that has recurring carboxamide linkages as integral portions of the polymer chain and which has a degree of polymerization of approximately 100 to 200; (b) a phenolic antioxidant having the formula

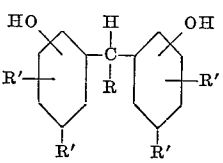

wherein R represents a member selected from the group consisting of a hydrogen atom and alkyl groups having from 1 to 3 carbon atoms and each R' represents an alkyl group having from 1 to 4 carbon atoms; and (c) a diester of a thiodialkanoic acid having the formula

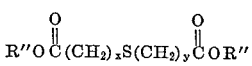

wherein $x$ and $y$ each represents a number in the range of 1 to 3 and each R'' represents a member selected from the group consisting of alkyl groups having from 8 to 20 carbon atoms, cycloalkyl groups, hydroxyalkyl groups having from 1 to 4 carbon atoms and polyalkylene glycol groups in the amounts of approximately 0.05% to 3% of said superpolyamide, 0.01% to 1% of said phenolic antioxidant, and 0.001% to 0.8% of said thiodialkanoic acid ester based on the weight of said polyoxymethylene diacetate.

4. The thermally-stable resinous composition of claim 3 wherein the superpolyamide is a terpolymer having the approximate composition of 38% by weight of polycaprolactam/35% by weight of polyhexamethylene adipamide/27% by weight of polyhexamethylene sebacamide.

5. The thermally-stable resinous composition of claim 3 wherein the superpolyamide is N-methoxymethyl polyhexamethylene adipamide.

6. The thermally-stable resinous composition of claim 3 wherein the phenolic antioxidant is 4,4'-butylidene bis (3-methyl-6-tert. butylphenol).

7. The thermally-stable resinous composition of claim 3 wherein the phenolic antioxidant is 2,2'-methylene bis (4-methyl-6-tert. butylphenol).

8. The thermally-stable resinous composition of claim 3 wherein the thiodialkanoic acid ester is dilauryl 3,3'-thiodipropionate.

9. The thermally-stable resinous composition of claim 3 wherein the thiodialkanoic acid ester is distearyl 3,3'-thiodipropionate.

10. A stabilizer for polyoxymethylene compositions comprising (a) a superpolyamide which is a macromolecular condensation polymer that has recurring carboxamide linkages as integral portions of the polymer chain and which has a degree of polymerization of approximately 100 to 200; (b) a phenolic antioxidant having the formula

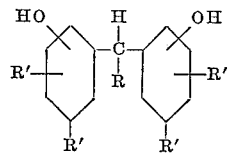

wherein R represents a member selected from the group consisting of a hydrogen atom and alkyl groups having from 1 to 3 carbon atoms and each R' represents an alkyl group having from 1 to 4 carbon atoms; (c) a diester of a thiodialkanoic acid having the formula

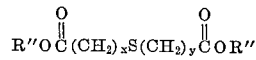

wherein $x$ and $y$ each represents a number in the range of 1 to 3 and each R' represents a member selected from the group consisting of alkyl groups having from 8 to 20 carbon atoms, cycloalkyl groups, hydroxyalkyl groups having from 1 to 4 carbon atoms, and polyalkylene glycol groups; and (d) a solvent in the amounts of approximately 0.1 to 100 parts of said superpolyamide and 0.1 to 50 parts by weight of said phenolic antioxidant per part by weight of said thiodialkanoic acid ester.

11. A stabilizer for polyoxymethylene compositions comprising (a) a superpolyamide which is a macromolecular condensation polymer that has recurring carboxamide linkages as integral portions of the polymer chain and which has a degree of polymerization of approximately 100 to 200; (b) a phenolic antioxidant having the formula

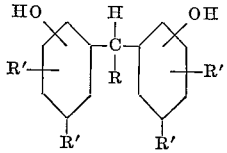

wherein R represents a member selected from the group consisting of a hydrogen atom and alkyl groups having from 1 to 3 carbon atoms and each R' represents an alkyl group having from 1 to 4 carbon atoms; (c) dilauryl 3,3'-thiodipropionate; and (d) a solvent in the amounts of 1 to 20 parts by weight of the superpolyamide and 1 to 10 parts by weight of the phenolic antioxidant per part by weight of dilauryl 3,3'-thiodipropionate.

12. The stabilizer of claim 11 wherein the superpolyamide is a terpolymer having the approximate composition of 38% by weight of polycaprolactam/35% by weight of polyhexamethylene adipamide/27% by weight of polyhexamethylene sebacamide.

13. The stabilizer of claim 11 wherein the superpolyamide is N-methoxymethyl polyhexamethylene adipamide.

14. The stabilizer of claim 11 wherein the phenolic antioxidant is 2,2'-methylene bis (4-methyl-6-tert. butylphenol).

15. The stabilizer of claim 11 wherein the phenolic antioxidant is 4,4'-butylidene bis (3-methyl-6-tert. butylphenol).

16. In the process for the stabilization of polyoxymethylene compositions in which high molecular weight polyoxymethylene is intimately mixed with (a) a superpolyamide which is a macromolecular condensation polymer that has recurring carboxamide linkages as integral portions of the polymer chain and which as a degree of polymerization of approximately 100 to 200 and (b) a phenolic antioxidant having the formula

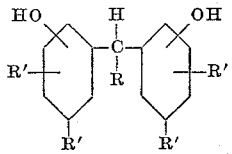

wherein R represents a member selected from the group consisting of a hydrogen atom and alkyl groups having from 1 to 3 carbon atoms and each R' represents an alkyl group having from 1 to 4 carbon atoms, the improvement that comprises adding to said composition approximately 0.0001% to 1% based on the weight of the polyoxymethylene of a diester of a thiodialkanoic acid having the formula

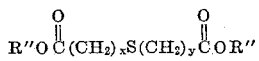

wherein $x$ and $y$ each represents a number in the range of 1 to 3 and each R" represents a member selected from the group consisting of alkyl groups having from 8 to 20 carbon atoms, cycloalkyl groups, hydroxyalkyl groups having from 1 to 4 carbon atoms, and polyalkylene glycol groups.

17. The process of claim 16 wherein the thiodialkanoic acid ester is dilauryl 3,3'-thiodipropionate.

18. The process of claim 16 wherein the thiodialkanoic acid ester is distearyl 3,3'-thiodipropionate.

19. The process of claim 16 wherein the thiodialkanoic acid ester is di (hydroxyethyl) 3,3'-thiodipropionate.

20. The process of claim 16 wherein the thiodialkanoic acid ester is di (polyethylene glycol) 3,3'-thiodipropionate.

No references cited.

MURRAY TILLMAN, *Primary Examiner.*